July 27, 1965  P. P. RUMINSKY  3,196,751
APPARATUS FOR WORK PIECE HANDLING
Original Filed March 5, 1963  3 Sheets-Sheet 1

INVENTOR
PAUL P. RUMINSKY

July 27, 1965 P. P. RUMINSKY 3,196,751
APPARATUS FOR WORK PIECE HANDLING
Original Filed March 5, 1963 3 Sheets-Sheet 2

INVENTOR
PAUL P. RUMINSKY

July 27, 1965        P. P. RUMINSKY        3,196,751
APPARATUS FOR WORK PIECE HANDLING
Original Filed March 5, 1963        3 Sheets-Sheet 3
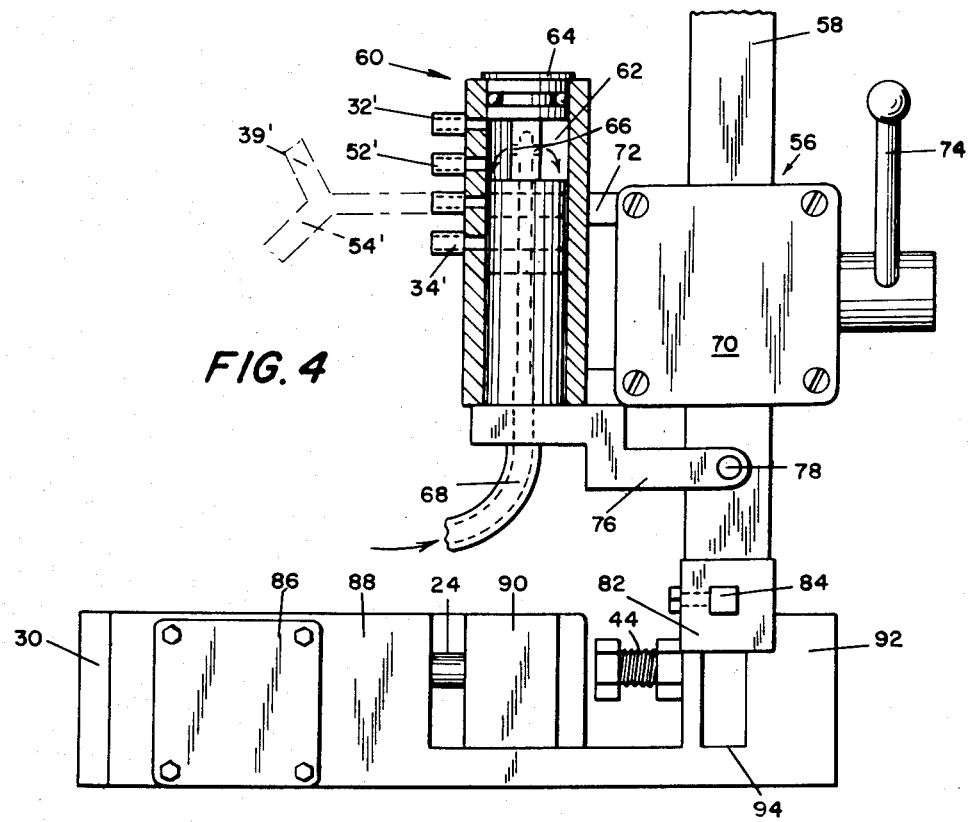
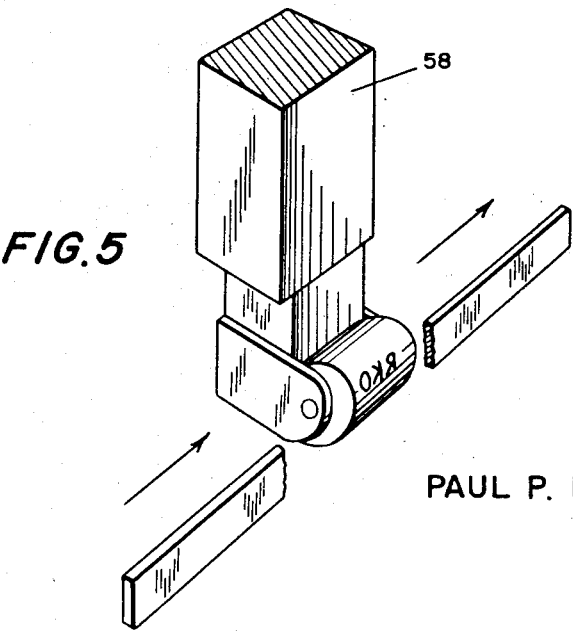
INVENTOR
PAUL P. RUMINSKY

United States Patent Office 3,196,751
Patented July 27, 1965

3,196,751
APPARATUS FOR WORK PIECE HANDLING
Paul P. Ruminsky, Amherst, Ohio, assignor to
Herbert C. Brauchla, Fremont, Ohio
Original application Mar. 5, 1963, Ser. No. 263,024.
Divided and this application Dec. 10, 1963, Ser.
No. 329,510
7 Claims. (Cl. 90—15.1)

The present application concerns an apparatus for longitudinally advancing a work piece in accurate increments in order that a milling or like operation may be carried out consecutively upon the work piece.

This application is a division of applicant's application Serial No. 263,024, filed March 5, 1963, and entitled Method for Work Piece Handling.

Many previous inventors have developed pneumatically powered devices for handling of work pieces upon which consecutive drilling, milling, engraving and like operations are to be carried out. Normally, these work piece handlers have provided vise means for stationary positioning of the piece being worked, while the actual milling or engraving devices are mounted upon carriage-like members which move longitudinally across the piece in the desired work increments. The present apparatus is distinguished from prior devices in that the work piece itself is advanced longitudinally in the desired increments while the vise members and the working members remain stationary. The apparatus is characterized by its simplicity and relative inexpensiveness.

The present apparatus is adapted for utilization according to the method described in the parent application and comprising the steps of supporting the work piece in a longitudinal trough, transversely locking a mid-portion of said work piece within said trough, longitudinally advancing said work piece during said locking of said mid-portion; transversely locking a rear portion of said work piece in said trough while releasing locking of said mid-portion upon completion of said advancing; returning to transversely lock a sequential mid-portion of said work piece; and again lonigtudinally advancing said work piece during said locking of said mid-portion while releasing locking of said work piece in said rear portion.

A suggested apparatus consists simply of two stationary end members defining a work piece trough and an intermediary stroke advance clamp longitudinally reciprocable therebetween. Pneumatic locking means are provided in the stroke advance clamp and in the feeding end of the trough. Actuation of the locking means, as well as advancing of the intermediary stroke advance clamp are effected pneumatically in sequence, as the milling or like working ram reciprocates vertically through the end portion of the trough and against the side of the piece being worked.

Accordingly, it is an object of invention to provide an apparatus for handling a work piece upon which cutting operations are to be carried out.

Another object of invention is to provide an apparatus for longitudinally advancing a work piece rather than the vise and cutting mechanism with which it is used.

Yet, additional objects of invention will become from the ensuing specification and attached drawings wherein:

FIG. 4 is an enlarged fragmentary front elevation, partially in section, showing the slide valve assembly, including piston valve actuated by the rack ram; and FIG. 5 is an enlarged perspective of a modification wherein a marking roller, instead of a cutter, is attached to the rack ram.

Figure 1:
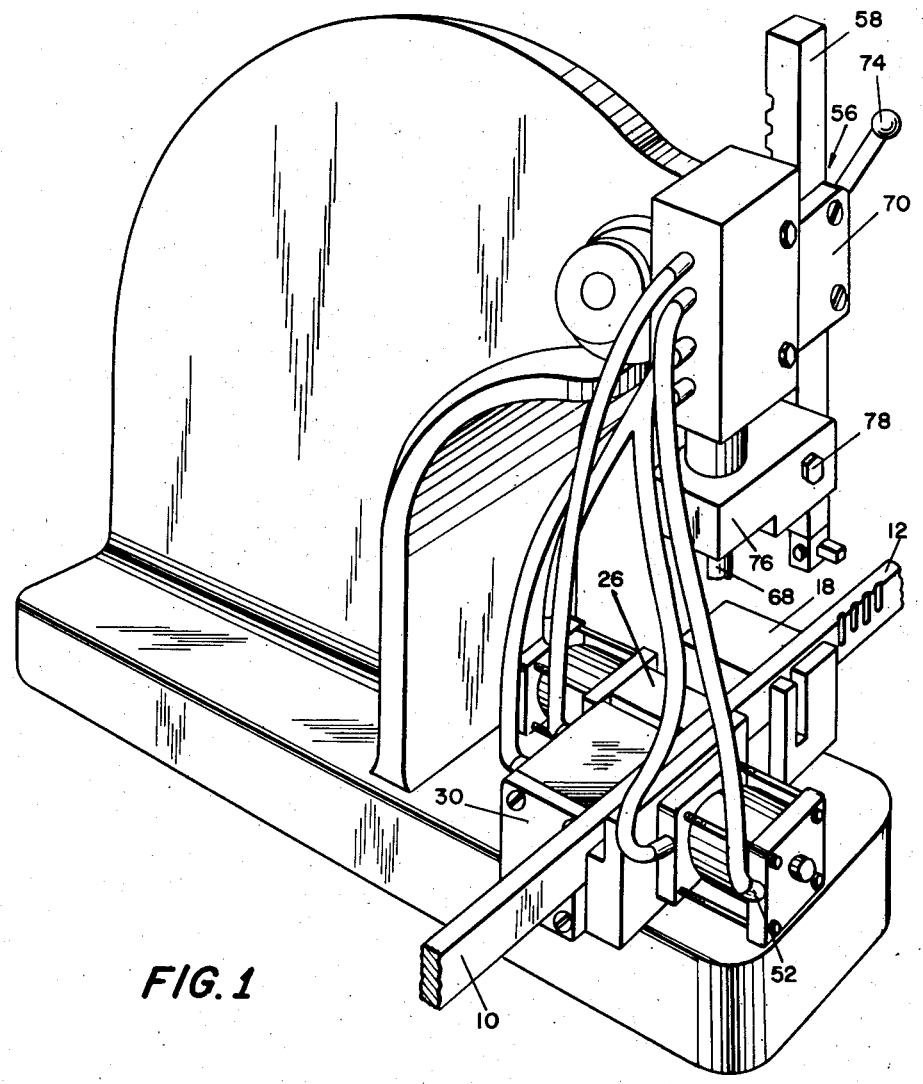
FIG. 1 is a perspective of the suggested work piece handler construction, showing the work piece in fragment.
Figure 2:
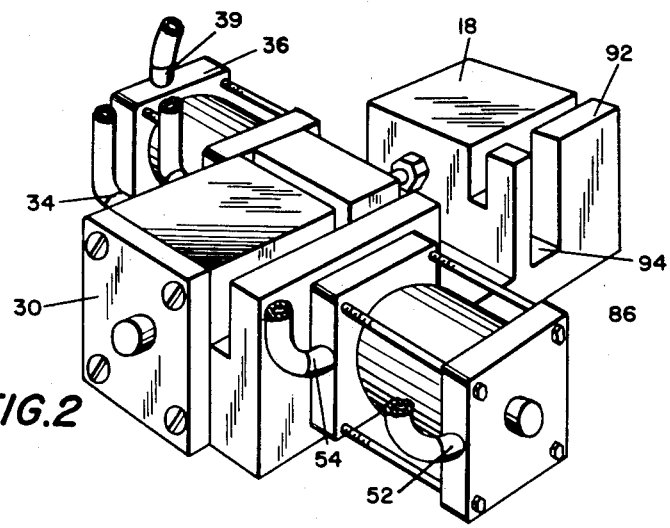
FIG. 2 is an enlarged perspective of the base element, including an intermediary advance clamp reciprocated between the two stationary end members which define a work piece trough.
Figure 3:
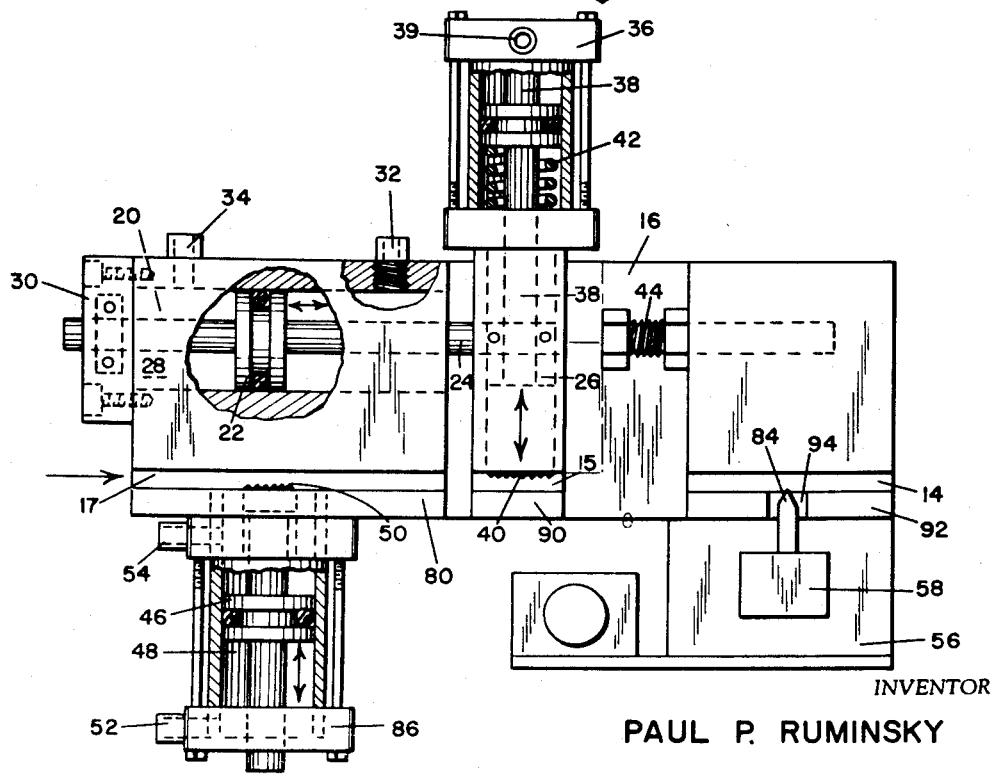
FIG. 3 is a top plan of the assembly of FIG. 1.

In FIGS. 1 and 3 a flat bar stock 10 is shown as being advanceable in trough sections 14, 15 and 17 respectively defined by stripper flanges 80, 90 and 92. The trough is cut longitudinally through main feed cylinder 20, intermediary stroke advance clamp 26 and stationary end limit block 18. Flat bar stock 10 is introduced at the feed cylinder end of the trough and advanced longitudinally therein by stroke advance clamp 26 for milling of transverse slots by means of ram 58 holding cutting tool 84.

Base 16 supports all components. Main feed cylinder 20 includes air feed chamber 28 with longitudinally reciprocable piston 22 mounted therein by means of end plate 30, having extension 24 secured within stroke advance clamp 26. Air feed chamber 28 includes at one end feed cylinder retract port 32 and at the other end feed cylinder advance port 34.

Transverse locking of work piece bar stock 10 in the feed cylinder portion of the trough is effected by piston 48 mounted within bellows two-inch stroke air cylinder 46 with inner piston 48 having at its end a serrated burr or gripper 50 which protrudes transversely of trough 17 to engage the work piece. Cylinder 46 includes piston lock air entry port 52 and piston release air entry port 54.

Stroke advance clamp 26 contains locking piston 38 supported within bellows one-inch stroke air cylinder 36 which includes an air locking port 39 and a spring return 42. Piston 38 protrudes transversely of the stroke advance clamp portion of trough 15, and has a serrated burr or gripper 40 similar to gripper 50.

Stationary end limit piece 18 includes an adjustable limit screw 44 which limits the advance of stroke advance clamp 26 to the position indicated in phantom in FIG. 3. Manifestly, screw 44 may be adjusted to increase or decrease the distance of clamp 26 advance and thus the increments of work piece 10 advance. The vertically reciprocable milling or working assembly is more particularly illustrated in FIG. 4 and is shown as comprising a conventional arbor press 56 in which a rack ram is vertically reciprocated through pinion plate 70 by means of lever arm 74. Rack ram 58 at its lower end may have a tool holder 82 in which cutter tool 84 may be mounted.

In the modification of invention illustrated in FIG. 5 a stamping roller is mounted for marking of an advancing work piece in increments. Manifestly, various types of etching, milling, punching, shaving, cut-off, coining, or labeling devices may be attached in the tool holder portion of the rack ram.

A transverse cut-out portion 94 is provided in stripper flange 92 to enable unimpeded access of the cutter downwardly throughout the full transverse face of bar stock 10. Slide valve assembly 60 is attached to pinion plate 70 by arms 72 or like means and includes a vertically reciprocable slide valve piston 64 moving within chamber 62. Piston 64 has air exit ports 66 communicant with air feed line 68 into which air has been introduced at 60 p.s.i., although greater or lesser pressures may be effectively employed. Piston 64 at its lower end is connected to slide actuating arm 76 by means of a conventional lock screw. Slide arm 76 in turn may be secured by means of bolt 78 to rack arm 58 with the result that as rack arm 58 is actuated downwardly slide arm 76 is similarly actuated downwardly. Accordingly piston 64 opens feed ports 32′, 52′, 39′, 54′, and 34′ with the result that air is fed via connecting tubing to the corresponding ports 32, 52, 39, 54, and 34. Although compressed air is indicated as the control medium, hydraulic fluid with a bleed off and recovery system might be employed.

At the start of the cycle with rack ram 58 in upper position and bar stock 10 placed fully within trough 14, 15 and 17, slide valve 64 is porting air through ports 32' and 52' thus into air feed ports 32 and 52. The feeding of air into port 32 returns feed air piston 22 to its retracted position carrying with it stroke advance clamp 26 to which it is attached. Port 52' is connected with air entry port 52 of bellows two-inch air cylinder 46. Air pressure being advanced into cylinder 46 via port 52 pushes piston 48 gripper 50 against bar stock 10 within trough 17 and thus keeps bar stock 10 from sliding rearwardly, as stroke advance clamp 26 is returned for another transverse bite on bar stock 10.

On the start of rack ram 58 downward stroke and corresponding downward movement of piston 64, air supply to port 32' is cut off, relieving pressure on the main cylinder 20 forward portion and enabling an advance stroke of piston 22. As the downward stroke of rack ram 58 continues port 52 is cut off relieving locking pressure on the two-inch cylinder 46. Sequentially, aid is fed into bellows 1-inch stroke cylinder 36 via port 39 and air feed via port 54 returns 2-inch cylinder 48 to its retarded position while releasing the rear grip on bar stock 10. Sequentially, air is fed via port 34 advancing piston 22 and bar stock 10 the desired increment for the next cutting. The forward advance of stroke advance and bar stock 10 together continue until stroke-adjusting screw 44 is encountered, stopping the longitudinal advance. Ram 58 continues its downward movement as the V-tool 84 cuts a notch in bar stock 10 and engages the work piece base 16. On the return stroke port 34' is relieved of air pressure, thus opening the retard end of main cylinder 20, ports 54' and 39' are opened thus relieving pressure on ports 39 and 54, respectively releasing locking pressure on piston 38 and releasing retract pressure on piston 46. As the ram 58 continues upward port 52 is opened, advancing piston 48 and holding bar stock 10 from sliding backward while port 32 is opened, returning the feed air piston 22 and stroke advance clamp 26 to the starting position for the before-described advancing operation.

As will be apparent, the essence of invention consists in the synchronous locking of the work piece at its mid and rear portions and advancing the work piece itself while carrying out the vertical cutting action on the leading portion of the work piece. Structural improvement is achieved in the elimination of carriage-like members which in conventional devices move while holding the work piece stationary. Manifestly, substitution of parts may be accomplished and locking the work piece may be variously accomplished without departing from the spirit and scope of invention, as defined in the subjoined claims.

I claim:

1. A work piece handler of the type including a base with a work piece trough defined therein and comprising:
   (a) a stationary cylinder piece with a first locking member supported at one end of said base;
   (b) a movable intermediary advance clamp having a work piece secondary locking member actuated transversely of said trough;
   (c) a stationary end limit block supported at the other end of said base and abutting said advance clamp in advance position;
   (d) means longitudinally advancing said advance clamp and a work piece secured to said advance clamp by said secondary locking member.

2. A work piece handler comprising a base with the following elements defining a longitudinal work piece trough therein;
   (a) a main cylinder piece with an air chamber and reciprocal piston mounted therein, said piston having an extension beyond said chamber;
   (b) an intermediary stroke advance clamp supported upon said piston extension;
   (c) a stationary end limit piece abutting said advance clamp in its position of furthest advance from said main cylinder piece; and
   (d) work piece locking means in said stroke advance clamp and reciprocable transversely of said trough.

3. A work piece handler as in claim 2, including means selectively locking said work piece in the main cylinder portion of said trough while said stroke advance clamp returns with said piston toward said cylinder piece.

4. A work piece handler as in claim 3, including work piece engaging means supported over said base and vertically reciprocable through the end limit portion of said trough, sequentially of advance of said stroke advance clamp and a work piece advanced therewith in said trough.

5. A work piece handler as in claim 4, including a fluid actuating system operable upon reciprocation of said work piece engaging means to actuate said piston and stroke advance clamp and said locking means.

6. A work piece handler of the type including a base with aligned elements defining a longitudinal work piece trough comprising:
   (a) a main cylinder piece with an air chamber and reciprocable piston mounted therein, said piston having an extension beyond said chamber;
   (b) a work piece locking mechanism attached to said base and reciprocable transversely of the cylinder portion of said work piece trough and including a pneumatically actuable piston therein;
   (c) an intermediary stroke advance clamp supported upon said piston extension;
   (d) a work piece locking mechanism including a piston reciprocable through said stroke advance clamp transversely of said trough to engage a work piece;
   (e) a stationary end limit piece abutting said advance clamp in its position of furthest advance from said main cylinder piece and including a transverse cutting section in said trough;
   (f) a vertically reciprocable ram supported upon said base and vertically reciprocable within said cutting section; and
   (g) pneumatic control means, including a set of valves in series supported adjacent said ram, said valves being openable in conjunction with movement of said ram and extension members extending from said valves to said main cylinder piece, said advance clamp pistons and said locking pistons.

7. A work piece handler as in claim 6, including means evacuating said cylinder and said locking mechanism.

References Cited by the Examiner
UNITED STATES PATENTS

| 2,586,536 | 2/52 | Haller | 226—162 X |
| 3,140,032 | 7/64 | Heath et al. | 226—162 X |

WILLIAM W. DYER, Jr., *Primary Examiner.*